(12) United States Patent
Ford et al.

(10) Patent No.: US 7,004,039 B1
(45) Date of Patent: Feb. 28, 2006

(54) AMBIENT PRESSURE COMPENSATED TACTILE SENSOR

(75) Inventors: Kenneth Ford, Panama City, FL (US); Jeffery Pray, Panama City Beach, FL (US); Chris Richburg, Panama City, FL (US); Charles Bernstein, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 158 days.

(21) Appl. No.: 10/779,586

(22) Filed: Feb. 17, 2004

(51) Int. Cl.
*G01L 1/02* (2006.01)
*G01L 5/08* (2006.01)
*G01L 7/00* (2006.01)

(52) U.S. Cl. .............................. 73/862.581
(58) Field of Classification Search ........... 73/862.581
See application file for complete search history.

(56) References Cited

U.S. PATENT DOCUMENTS 4,335,835 A * 6/1982 Beigler et al. ............... 222/95

* cited by examiner

*Primary Examiner*—Max Noori
*Assistant Examiner*—Octavia Davis
(74) *Attorney, Agent, or Firm*—James T. Shepherd

(57) ABSTRACT

A tactile sensor comprises a sensing bladder in pneumatic communication with a first diaphragm side of a pneumatic diaphragm via a first fluid; the pneumatic diaphragm being actuatable by a displacement of the first fluid within the sensing bladder; the pneumatic diaphragm further comprising a second diaphragm side in fluid isolation from the first diaphragm side; the second diaphragm side being pneumatically biased against the first diaphragm side, and the second diaphragm side and the first diaphragm side of the pneumatic diaphragm each being in pneumatic communication with an external environment.

30 Claims, 4 Drawing Sheets

AMBIENT PRESSURE COMPENSATED TACTILE SENSOR

GOVERNMENT RIGHTS

The invention described herein may be manufactured and used by or for the Government of the United State of America for governmental purpose without payment of any royalties thereon or therefor.

BACKGROUND OF THE INVENTION

The present invention generally relates to a tactile sensor, and a method to tactilely sense, and more specifically, to a tactile sensor and method to tactilely sense which may not be affected by the application of pressure applied to the sensor by the environment in which the sensor may be located.

The ability to sense touch may be of particular importance for tasks such as close-up assembly work, where vision may be obscured by objects, or may not be possible due to an absence of light or other conditions. Touch may by used to provide sensory feedback necessary for griping or sensing objects, determining the orientation of objects, and the like. Touch may be sensed using a tactile sensor. A tactile sensor may be incorporated on, for example, remote control vehicles, robots, and/or may be utilized as tamper warning devices, or other such warning devices on various machines, systems, and the like.

Various systems may be used to tactically sense an object. Tactile sensors may include, for example, elastomeric skins embodying conductive elements, piezoelectric elastomers, and/or deformable skins comprising semi-conductive coils that may be actuated through application of pressure, and which may provide electrical or other feedback signals representative of an object being sensed. Such feedback may then be further manipulated or used by various systems to which a tactile sensor may be in communication with.

To operate properly in some systems, tactile sensors may be required to be sensitive to various forms of touch such that an application of pressure to the sensor actuates the sensor to provide feedback. However, the environment in which the sensor may be located may also apply a force to the sensor. The sensor may thus be required to be actuated upon application of a touching force that may be less than a force that may be applied to the sensor by the environment in which the sensor may be located. Such a condition may exist, for example, in a system using a tactile sensor operated below water, in particular, at depths approaching 50 or more feet under water. To counteract such an environmental force, the tactile sensor may need to include a static or fixed bias against such a force, and/or made less sensitive to overcome such environmental forces. Thus, to overcome a pressure exerted on a tactile sensor by an external environment, a tactile sensor may lack sensitivity desired for a particular application.

When an environmental pressure that may be applied to a sensor by an external environment results in a reduction of applied force, a tactile sensor may also not operate properly. For example, should a tactile sensor be operated at an altitude typical for aircraft operation, the external environment may apply less pressure on the sensor than would be applied to the sensor if the aircraft were at ground level. The environmental pressures may thus require a greater force to be applied to the tactile sensor to achieve the same result as would a lesser force applied at a higher environmental pressure. As such, a sensor at high altitudes may lack sensitivity in a desired range, or may not function at all.

As can be seen, there is a need for a tactile sensor that may not be impacted by the external environment in which the sensor may be expected to operate. Further, there is a need for a tactile sensor that may be used in environments above atmospheric pressure, in environments below atmospheric pressure, and which may provide various forms of feedback representative of a spatial arrangement of an object that may be sensed.

SUMMARY OF THE INVENTION

In one aspect of the present invention, a tactile sensor for detecting contact therewith in an ambient environment comprises a pneumatic diaphragm having a first diaphragm side and a second diaphragm side, where the second diaphragm side is in pneumatic communication with the ambient environment through a second fluid; a sensing bladder having a first sensing bladder side and a second sensing bladder side, where the second sensing bladder side is in pneumatic communication with the ambient environment; a first atrium enclosing a first fluid, the first atrium comprising the first diaphragm side and the first sensing bladder side; and a mechanical connection in contact with the pneumatic diaphragm for detecting movement of the pneumatic diaphragm.

In another aspect of the present invention, a tactile sensor for detecting contact therewith in an ambient environment comprises a pneumatic diaphragm having a first diaphragm side and a second diaphragm side, where the second diaphragm side is in pneumatic communication with the ambient environment; the first diaphragm side being pneumatically biased against the second diaphragm side through the pneumatic diaphragm; a sensing bladder having a first sensing bladder side and a second sensing bladder side, where the second sensing bladder side is in pneumatic communication with the ambient environment; a compensation bladder having a first compensation bladder side and a second compensation bladder side, where the second compensation bladder side is in pneumatic communication with the ambient environment; a first atrium enclosing a first fluid, the first atrium comprising the first diaphragm side and the first sensing bladder side; a second atrium enclosing a second fluid; the second atrium comprising the second diaphragm side and the first compensation bladder side; and a mechanical connection in contact with the pneumatic diaphragm for detecting movement of the pneumatic diaphragm.

In yet another aspect of the present invention, a tactile sensor for detecting contact therewith in an ambient environment comprises a plurality of pneumatic diaphragms, at least one of the pneumatic diaphragms having a first diaphragm side and a second diaphragm side, where the second diaphragm side is in pneumatic communication with the ambient environment through a second fluid; a plurality of sensing bladders, at least one of the sensing bladders having a first sensing bladder side and a second sensing bladder side, where the second sensing bladder side is in pneumatic communication with the ambient environment; a first atrium enclosing a first fluid, the first atrium comprising the first diaphragm side and the first sensing bladder side; and a mechanical connection in contact with the at least one pneumatic diaphragm for detecting movement of the at least one pneumatic diaphragm.

In still another aspect of the present invention, a tactile sensor for detecting contact therewith in an ambient environment comprises a pneumatic diaphragm having a first diaphragm side and a second diaphragm side, where the second diaphragm side is in pneumatic communication with the ambient environment; the first diaphragm side being biased against the second diaphragm side through the pneumatic diaphragm; a sensing bladder having a first sensing bladder side and a second sensing bladder side, where the second sensing bladder side is in pneumatic communication with the ambient environment; the first sensing bladder side comprising an inner wall of a vinyl tube sealed on one end, and the second sensing bladder side comprising an outer wall of the vinyl tube separated from the inner wall of the vinyl tube by a tube thickness; a compensation bladder having a first compensation bladder side and a second compensation bladder side, where the second compensation bladder side is in pneumatic communication with the ambient environment; the first compensation bladder side comprising an inner finger glove wall of a finger glove, where the inner finger glove wall is sealingly attached about an outer circumference of a hollow rigid member, and the second compensation bladder side comprising an outer finger glove wall of the finger glove separated from the inner finger glove wall by a glove thickness; a first atrium enclosing a first fluid, the first atrium comprising the first diaphragm side and the first sensing bladder side; a second atrium enclosing a second fluid; the second atrium comprising the second diaphragm side and the first compensation bladder side; and a mechanical connection in contact with the pneumatic diaphragm for detecting movement of the pneumatic diaphragm.

In still another aspect of the present invention, a method to tactilely sense an object comprises the step of contacting an object in an ambient environment with a sensing bladder of a tactile sensor, the tactile sensor comprising a pneumatic diaphragm having a first diaphragm side and a second diaphragm side, where the second diaphragm side is in pneumatic communication with the ambient environment through a second fluid; a sensing bladder having a first sensing bladder side and a second sensing bladder side, where the second sensing bladder side is in pneumatic communication with the ambient environment; a first atrium enclosing a first fluid, the first atrium comprising the first diaphragm side and the first sensing bladder side; and a mechanical connection in contact with the pneumatic diaphragm for detecting movement of the pneumatic diaphragm.

These and other features, aspects and advantages of the present invention will become better understood with reference to the following drawings, description and claims.

DETAILED DESCRIPTION OF THE INVENTION

Figure 1:
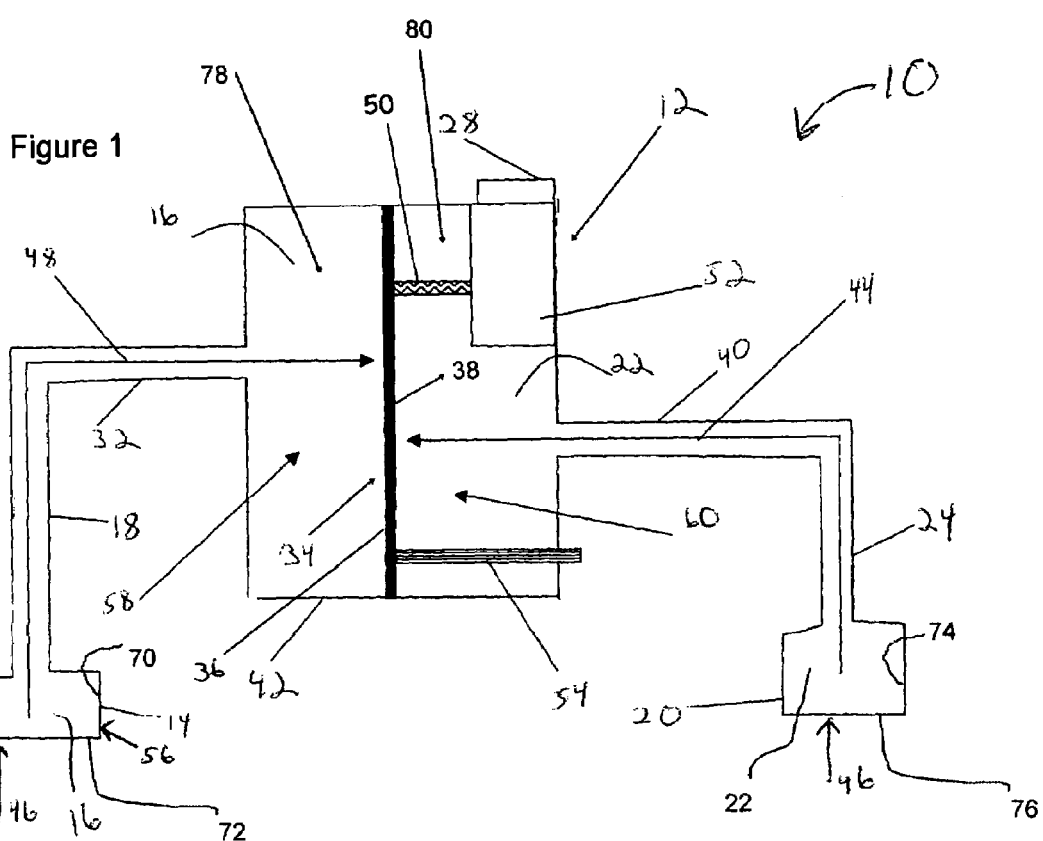
FIG. 1 shows a plan view of an embodiment of a pneumatic transducer in combination with the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a tactile sensor which may be compensated against an external pressure, such as an ambient pressure at which the tactile sensor may be operated. In an embodiment, the present invention may be useful in environments which may apply an ambient pressure to the tactile sensor that may be above or below atmospheric pressure at sea level. Examples of such environments in which an embodiment of the present invention may be useful may include underwater environments such as those found on the underside of a marine vessel, on a submarine vessel, on an underwater robot, and the like. In an embodiment, the present invention may be useful as a tactile sensor on submersible robots, and/or as a tamper or other type of indicator on a submersible device such as an anti-ship mine. In another embodiment, the present invention may be useful for tactilely sensing in environments that may exert a reduced pressure on a sensor, as compared to atmospheric pressure at sea level. Accordingly, in an embodiment, the present invention may be useful in tactile sensing on an aircraft, on a spacecraft, or the like.

In an embodiment, the tactile sensor of the present invention may comprise a sensing bladder that may be in pneumatic communication with a pneumatic transducer. As used herein, pneumatic communication may include communication via a fluid, and a fluid may include both a gas and/or a liquid. The pneumatic transducer may include a pneumatic diaphragm having a first side and a second side. A first side of the sensing bladder may be in fluid communication with the first side of the pneumatic diaphragm via a first fluid. The pneumatic diaphragm may be actuatable by a displacement of the first fluid within the sensing bladder. The pneumatic diaphragm may further comprise a second side, which may be in fluid isolation from the first side, and which may be in pneumatic communication with the first side such that the second side may be pneumatically biased against the first side. Each of the second side and the first side of the pneumatic diaphragm may also be in pneumatic communication with an external environment. This is unlike the prior art of tactile sensors, which may not comprise a pneumatic diaphragm having a second side pneumatically biased against a first side that may also be in pneumatic communication with an external environment.

In still another embodiment, the tactile sensor of the present invention may comprise a sensing bladder having a first side and a second side, where the second side is in pneumatic communication with an ambient environment. The tactile sensor may also include a first atrium enclosing a first fluid, and comprising the first side of the pneumatic diaphragm and the first side of the sensing bladder. The embodiment may also include a compensation bladder having a first side and a second side, where the second side of the compensation bladder is in pneumatic communication with the ambient environment. Further, the tactile sensor may include a second atrium enclosing a second fluid, and comprising the second side of the pneumatic diaphragm and the first side of the compensation bladder. The compensation bladder may be in pneumatic communication with, and may be in fluid isolation from an external environment. This too is unlike the prior art, which may not provide a pneumatic diaphragm biased against an ambient pressure through a compensation bladder that may not be in fluid communication with an external environment.

In yet another embodiment, the present invention may comprise a plurality of pneumatic diaphragms, each of which may also comprise a first side and a second side. The first side of any one of the pneumatic diaphragms may be in fluid communication with any one of an array of sensing bladders via a first fluid. The second side of a particular pneumatic diaphragm may be pneumatically biased against the first side of that particular pneumatic diaphragm, and may also be in fluid communication with a compensation bladder via a second fluid. The compensation bladder, and each of the sensing bladders, may each be in pneumatic communication with an external environment, thus biasing the first side of the pneumatic diaphragm against the ambient pressure applied to both the first side and the second side of the pneumatic diaphragm. In addition, each of the pneumatic diaphragms may be actuatable by a displacement of the first fluid in the sensing bladder in fluid communication with that particular pneumatic diaphragm. This is unlike the prior art, which may not provide an array of tactile sensors, each of which being biased against an ambient pressure.

With reference to FIG. 1, an embodiment of the present invention includes a pressure compensated tactile sensor generally referred to as 10, which may include a pneumatic transducer 12. In general, the pneumatic transducer 12 may include a first transducer side 78, separated from a second transducer side 80 by a diaphragm 34, disposed within a transducer housing 42. The pneumatic diaphragm 34 may have a first diaphragm side 36 separated from a second diaphragm side 38. The pneumatic transducer 12 may further include a first inlet 32 which may be in fluid communication with the first diaphragm side 36 of pneumatic diaphragm 34.

The tactile sensor 10 may also include a sensing bladder 14 having a first sensing bladder side 70 and a second sensing bladder side 72. The second sensing bladder side 72 of sensing bladder 14 may be in pneumatic communication with an ambient environment (not shown) having an ambient pressure 46.

The tactile sensor 10 may also include a compensation bladder 20 having a first compensation bladder side 74 and a second compensation bladder side 76. The second compensation bladder side 76 of compensation bladder 20 may be in pneumatic communication with an ambient environment (not shown) having the ambient pressure 46. In an embodiment, the tactile sensor 10 may include a first atrium 58 enclosing a first fluid 16, and comprising the first transducer side 78 of pneumatic transducer 12, the first diaphragm side 36 of diaphragm 34, and the first sensing bladder side 70 of sensing bladder 14. The tactile sensor 10 may also include a second atrium 60 enclosing a second fluid 22, and comprising the second transducer side 80 second transducer side 80 of pneumatic transducer 12, the second diaphragm side 38 of diaphragm 34, and the first compensation bladder side 74 of compensation bladder 20.

The pneumatic transducer 12 may include a first inlet 32 that may be in fluid communication with the first transducer side 78 of pneumatic transducer 12 and with the first sensing bladder side 70 of sensing bladder 14 via a sensing conduit 18 through first fluid 16 disposed within sensing bladder 14, sensing conduit 18, first inlet 32, and the first transducer side 78 of pneumatic transducer 12. The second transducer side 80 second transducer side 80 of pneumatic transducer 12 may also include a second inlet 40 in fluid communication with the first compensation bladder side 74 of compensation bladder 20 via a compensation conduit 24 through the second fluid 22 which may be disposed within the compensation bladder 20, the compensation conduit 24, second inlet 40, and the second transducer side 80 second transducer side 80 of pneumatic transducer 12.

In an embodiment, pneumatic transducer 12 may also include a mechanical connection 50 between diaphragm 34 and an electric switch 52 which may be responsive to movement of diaphragm 34. Electric switch 52 may also include an electrical connector 28 to allow the present invention to communicate with an external system or systems (not shown). Mechanical connection 50 may be located on either side of diaphragm 34.

In another embodiment, the tactile sensor 10 may include a sensitivity adjustment 54, which may provide a means of adjusting the amount of movement by diaphragm 34 (e.g., the amount of displacement of first fluid 16 within sensing bladder 14) required to produce a response from electric switch 52. The sensitivity adjustment 54 may be in the form of a biasing spring (not shown), a contact position adjustment device (not shown), or the like, as known to those of skill in the art.

In an embodiment, the first diaphragm side 36 of diaphragm 34, and the second diaphragm side 38 of diaphragm 34 may be arranged within the transducer housing 42 such that second diaphragm side 38 may be in fluid isolation from the first diaphragm side 36, and such that second diaphragm side 38 may be in pneumatic communication with the first diaphragm side 36 through, for example, diaphragm 34. Second transducer side 80 second transducer side 80 of the pneumatic transducer 12 may also be arranged within transducer housing 42 to be biased against the first transducer side 78 of pneumatic transducer 12. By the second transducer side 80 second transducer side 80 being biased against the first transducer side 78, a second force 44 acting on the second diaphragm side 38 of diaphragm 34 from the second transducer side 80 of the pneumatic transducer 12 may cause diaphragm 34 to move in a direction towards the first transducer side 78 of pneumatic transducer 12. Accordingly, a first force 48 directed from the first transducer side 78 of pneumatic transducer 12 towards the first diaphragm side 36 of diaphragm 34, may cause diaphragm 34 to move in a direction towards the second transducer side 80 of pneumatic transducer 12. In the event that second force 44 and first force 48 may be equal, the diaphragm 34 would not move. In this embodiment, the compensation bladder 20 may thus provide for continuous operability over a range of ambient conditions (not shown) without requiring adjustment of the pneumatic transducer 12.

By an arrangement wherein second transducer side 80 of the pneumatic transducer 12 may be biased against first transducer side 78 of the pneumatic transducer 12, second force 44 may in effect be subtracted from first force 48. Such an arrangement may allow ambient pressure compensation of the present invention. For example, a second force 44, which may result from an external environmental force such as an ambient pressure 46 bearing down on compensation bladder 20, and transmitted via compensation conduit 24 and second inlet 40 through second fluid 22 to bear on second diaphragm side 38 of diaphragm 34, may be subtracted from a first force 48, which may be due to that same ambient pressure 46 bearing down on sensing bladder 14, and transmitted to first diaphragm side 36 of diaphragm 34 via sensing conduit 18, first inlet 32, and through first fluid 16. As long as the ambient pressure 46 remains the same on both the sensing bladder 14 and the compensation bladder 20, diaphragm 34 may not cause actuation of electric switch 52. As such, an embodiment of the present invention may be pressure compensated to an ambient pressure 46.

In the event of sensing bladder 14 having a tactical encounter with an external object (not shown), a touching force 56 may act on sensing bladder 14 to produce a displacement of the first fluid 16 within sensing bladder 14, which may produce a first force 48 in excess of the force applied by the ambient pressure 46. Accordingly, the first force 48 may then exceed second force 44 by an amount which may be proportional to the touching force 56. As such, touching force 56 may be communicated via first fluid 16 to the first diaphragm side 36 of diaphragm 34, which may cause diaphragm 34 to move in a direction towards the second transducer side 80 of the pneumatic transducer 12, and in so doing, may actuate electric switch 52.

Figure 2:
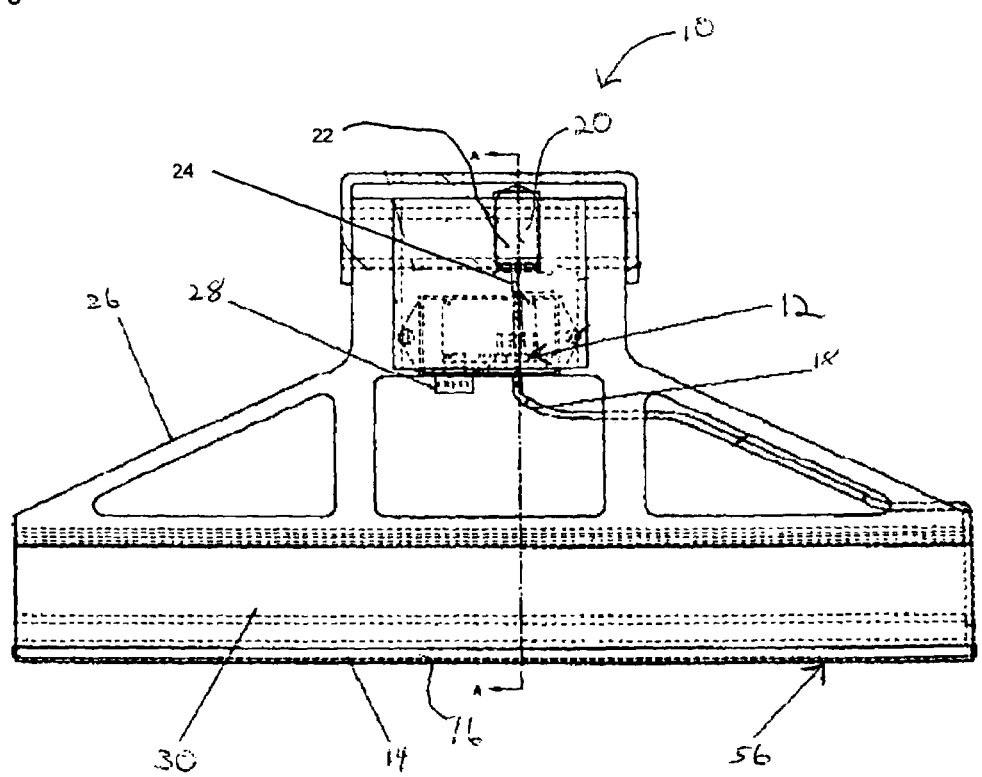
FIG. 2 illustrates a cross-sectional schematic representation of an embodiment of the present invention.
Figure 3:
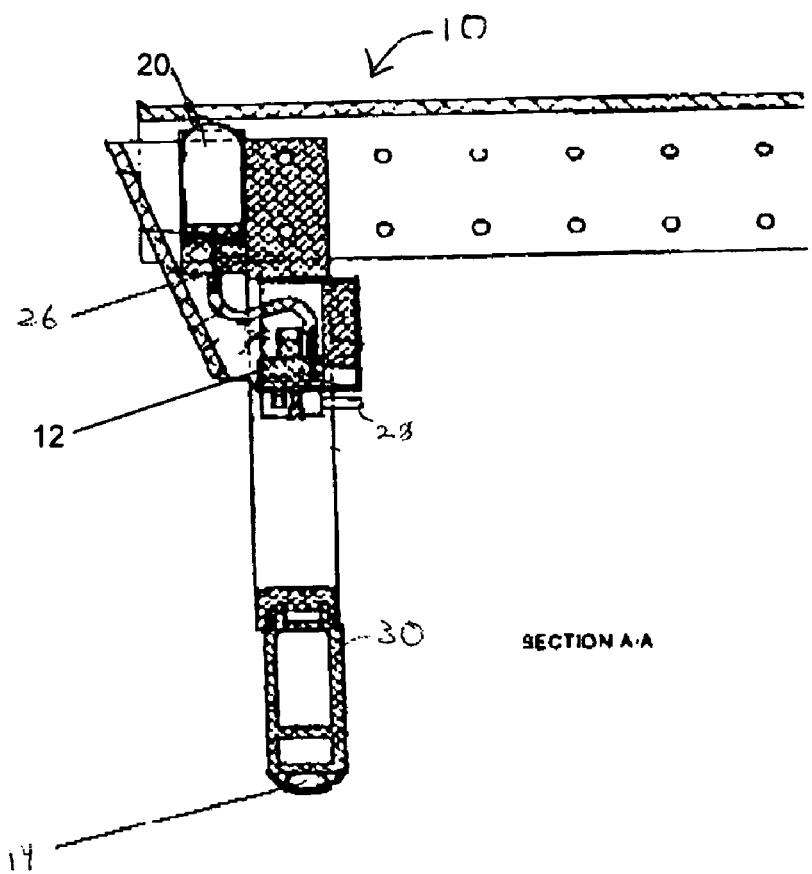
FIG. 3 illustrates a side view through A—A of the embodiment shown in FIG. 2.

Referring now to FIGS. 2 and 3, wherein an embodiment of the present invention is shown, the tactile sensor 10 may include a pneumatic transducer 12, which may be in fluid communication with a sensing bladder 14 via a first fluid 16, which may be disposed within the sensing bladder 14 and within a sensing conduit 18 that may connect sensing bladder 14 with the pneumatic transducer 12. The pneumatic transducer 12 may also be in fluid communication with a compensation bladder 20 via a second fluid 22 disposed within the compensation bladder 20 and within a compensation conduit 24 that may connect sensing bladder 14 with the pneumatic transducer 12.

In an embodiment, the present invention may also comprise one or more brackets 26, which hold the various components of the tactile sensor 10 in physical relationship to one another. Pneumatic transducer 12 may also be in electrical communication with an electrical connector 28, which may be in communication with various electronic circuits (not shown).

In an embodiment, the sensing bladder 14 may comprise any material that may be capable of becoming deformed when a pressure consistent with an intended use may be applied thereto. In another embodiment, the sensing bladder 14 may have a resiliency that allows the bladder to return to an original shape after being deformed from a touching force 56. Examples of a sensing bladder 14 may include various forms of pliable tubing, bellows, and the like. In an embodiment, the sensing bladder 14 may comprise a material which may not be substantially affected by the environment in which the tactile sensor 10 may be used. Examples of materials from which sensing bladder 14 can be formed may include various elastomeric materials formed into a variety of shapes such as, for example, a portion of a vinyl tube sealed on one end, a portion of rubber tubing, and the like. Accordingly, in an embodiment, the first sensing bladder side 70 of sensing bladder 14 may comprise an inner wall of a vinyl tube (not shown) sealed on one end, and the second sensing bladder side 72 of the sensing bladder 14 may comprise an outer wall of the vinyl tube (not shown) which may be separated from the inner wall of the vinyl tube by a tube thickness (not shown). In another embodiment, the sensing bladder 14 may also be disposed at least partially within a flexible sheath 30 (see FIGS. 2 and 3).

Figure 4:
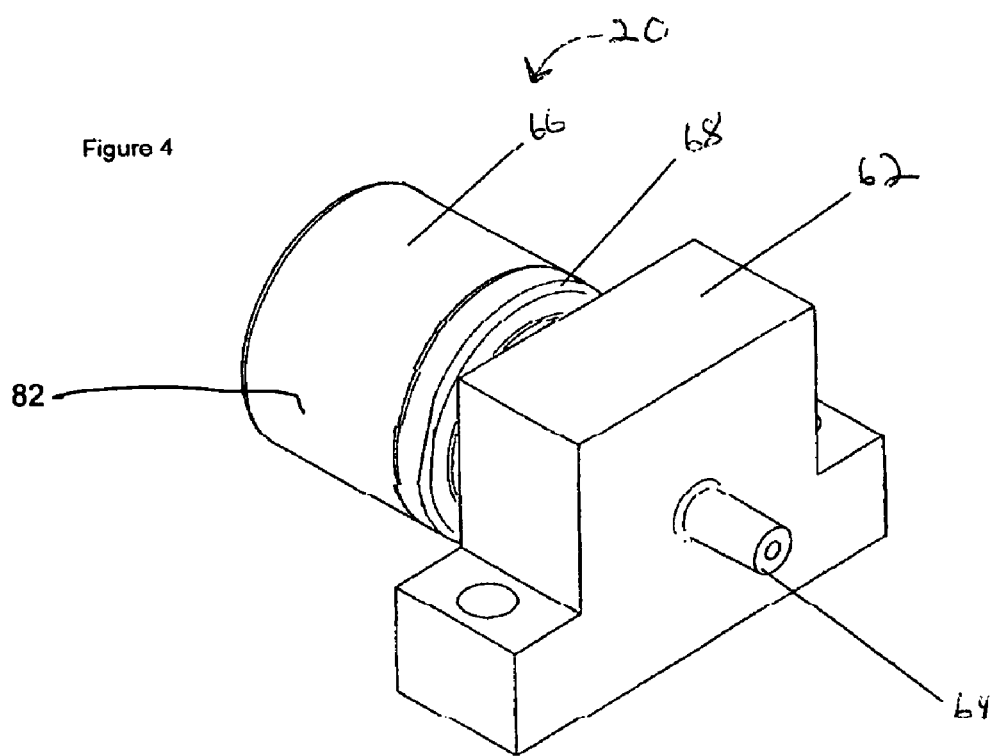
FIG. 4 shows a perspective view of a compensation bladder of an embodiment of the present invention.

Compensation bladder 20 may comprise a deformable material consistent with an intended use. As shown in FIG. 4, in an embodiment, compensation bladder 20 may include a finger glove 66 sealingly attached to a rigid member 62. In an embodiment, the first compensation bladder side 74 (not shown) of compensation bladder 20 may include an inner wall (not shown) of finger glove 66. The second compensation bladder side 76 of compensation bladder 20 may include the outer finger glove wall 82 of finger glove 66 that may be separated from the inner finger glove wall (not shown) of finger glove 66 by a glove thickness (not shown).

The inner finger glove wall (not shown) of finger glove 66 may be attached about a circumference (not shown) of a rigid member 62. The rigid member 62 may have a hollow portion (not shown) in fluid communication with an inlet 64 such that a cavity (not shown) bound by the inner finger glove wall (not shown) of the finger glove 66 and the hollow portion (not shown) of the rigid member, may form at least a portion of the first compensation bladder side 74 (not shown) of compensation bladder 20. The deformable portion (e.g., finger glove 66) of the compensation bladder 20 may be affixed to the rigid member 62 using an o-ring 68. Accordingly, compensation bladder 20 may compress or expand via finger glove 66 according to application of an ambient pressure (not shown). While compensation bladder 20 can be omitted to permit an ambient fluid from directly contacting diaphragm 34, compensation bladder 20 may usefully prevent contaminants from contacting diaphragm 34, or transducer 12.

Referring to FIGS. 1, 2, and 3, in an embodiment, the sensing bladder 14 may be connected to the pneumatic transducer 12 via a sensing conduit 18 and first inlet 32. The sensing conduit 18 and first inlet 32 may comprise a rigid material such that a displacement of first fluid 16 within sensing bladder 14 may be communicated to pressure transducer 12 without the fluid displacement being dampened by expansion of the sensing conduit 18 and first inlet 32. In another embodiment, sensing conduit 18 may comprise a flexible material, thus sensing conduit 18 may dampen a portion of the displacement of first fluid 16 upon application of a touching force 56 to produce a displacement of the first fluid 16 within the sensing bladder 14.

In an embodiment, first fluid 16, and second fluid 22 may be a non-compressible fluid, such as a liquid or a combination of liquids. In still another embodiment, first fluid 16, and/or second fluid 22 may be a compressible fluid, such as a gas or a combination of gasses. In an embodiment, water, or a liquid comprising water may be preferred for first fluid 16 and/or second fluid 22. In still another embodiment, first fluid 16 and/or second fluid 22 may be a non-compressible organic liquid. Glycerin or a liquid comprising glycerin may be preferred as first fluid 16 and/or second fluid 22 in an embodiment of the present invention.

In an embodiment, electric switch 52 may comprise an on-off type of switch. In still another embodiment, electric switch 52 may comprise a variable rheostat, a variable resistor, a variable capacitor, or the like, which may be capable of attenuating and/or modulating an electric signal in response to an amount of movement of diaphragm 34.

In an embodiment, second atrium 60 may be in fluid communication with a compensation bladder 20, while being in fluid isolation from an ambient environment (not shown). In still another embodiment, second atrium 60 may be in fluid communication with an ambient environment (not shown).

An embodiment of the present invention may also comprise an array (not shown) of sensing bladders 16, each of which may be in fluid communication with a first transducer side 78 of a pneumatic transducer 12. A separate pneumatic transducer 12 may be provided for each of the sensing bladders 16 in the array (not shown). Each of the pneumatic transducers 12 may comprise a second diaphragm side 38 of a pneumatic diaphragm 34, which may be in fluid communication with one or more compensation bladders 20 via a plurality of compensation conduits 24 and second inlets 40. In another embodiment, each of the second diaphragm sides 38 of the pneumatic diaphragms 34 may be in fluid communication with a single compensation bladder 20 via a plurality of compensation conduits 24. In still another embodiment, each of the second diaphragm sides 38 of the pneumatic diaphragms 34 may be in fluid communication with an ambient environment (not shown). The array (not shown) of sensing bladders 16 may be arranged in a grid formation, which may be arranged along one or more perpendicular axis's, or the like (not shown).

Accordingly, a method to tactilely sense an object utilizing an embodiment of the present invention may comprise the step of contacting an object with a sensing bladder of an embodiment of a tactile sensor as described herein. The method may further comprise the step of determining an output value of an electrical switch in mechanical communication with a diaphragm in pneumatic communication with the first fluid and the second fluid. In an embodiment of the method, the method may include an embodiment of the tactile sensor wherein the second side of a pneumatic diaphragm may be in fluid isolation from said external environment. In another embodiment of the method, an embodiment of the tactile sensor may include a second side of a pneumatic diaphragm in fluid communication with an external environment.

It should be understood, of course, that the foregoing relates to preferred embodiments of the invention and that modifications may be made without departing from the spirit and scope of the invention as set forth in the following claims.

We claim:

1. A tactile sensor for detecting contact therewith in an ambient environment comprising:
    a pneumatic diaphragm having a first diaphragm side and a second diaphragm side, where said second diaphragm side is in pneumatic communication with said ambient environment through a second fluid;
    a sensing bladder having a first sensing bladder side and a second sensing bladder side, where said second sensing bladder side is in pneumatic communication with said ambient environment;
    a first atrium enclosing a first fluid, said first atrium comprising said first diaphragm side and said first sensing bladder side; and
    a mechanical connection in contact with said pneumatic diaphragm for detecting movement of said pneumatic diaphragm.

2. The tactile sensor of claim 1, wherein said second diaphragm side is in fluid communication with said ambient environment through said second fluid.

3. The tactile sensor of claim 1, wherein said second diaphragm side is in fluid isolation from said ambient environment.

4. The tactile sensor of claim 1, wherein said second diaphragm side is pneumatically biased against said first diaphragm side.

5. The tactile sensor of claim 1, wherein at least one of said first fluid and said second fluid is a liquid.

6. The tactile sensor of claim 1, wherein at least one of said first fluid and said second fluid is a gas.

7. The tactile sensor of claim 1, wherein at least one of said first fluid and said second fluid comprise water.

8. The tactile sensor of claim 1, wherein at least one of said first fluid and said second fluid comprise an organic liquid.

9. The tactile sensor of claim 8, wherein at least one of said first fluid and said second fluid comprise glycerin.

10. A tactile sensor for detecting contact therewith in an ambient environment comprising:
    a pneumatic diaphragm having a first diaphragm side and a second diaphragm side, where said second diaphragm side is in pneumatic communication with said ambient environment;
    said first diaphragm side being pneumatically biased against said second diaphragm side through said pneumatic diaphragm;
    a sensing bladder having a first sensing bladder side and a second sensing bladder side, where said second sensing bladder side is in pneumatic communication with said ambient environment;
    a compensation bladder having a first compensation bladder side and a second compensation bladder side, where said second compensation bladder side is in pneumatic communication with said ambient environment;
    a first atrium enclosing a first fluid, said first atrium comprising said first diaphragm side and said first sensing bladder side;
    a second atrium enclosing a second fluid; said second atrium comprising said second diaphragm side and said first compensation bladder side; and
    a mechanical connection in contact with said pneumatic diaphragm for detecting movement of said pneumatic diaphragm.

11. The tactile sensor of claim 10, wherein said first atrium includes a sensing conduit arranged between said first diaphragm side, and said first sensing bladder side, and
    said sensing conduit is formed from a rigid material.

12. The tactile sensor of claim 10, wherein said sensing bladder comprises a pliable elastomeric material.

13. The tactile sensor of claim 12, wherein said first sensing bladder side comprises an inner wall of a vinyl tube sealed on one end, and said second sensing bladder side comprises an outer wall of said vinyl tube separated from said inner wall of said vinyl tube by a tube thickness.

14. The tactile sensor of claim 10, wherein said sensing bladder is disposed within a flexible sheath.

15. The tactile sensor of claim 10, wherein said first compensation bladder side comprises an inner wall of a finger glove;
    said inner wall of said finger glove is sealingly attached about an outer circumference of a hollow rigid member, and
    said second compensation bladder side comprises an outer wall of said finger glove separated from said inner wall of said finger glove by a glove thickness.

16. The tactile sensor of claim 10, wherein said mechanical connection in contact with said pneumatic diaphragm for detecting movement of said pneumatic diaphragm includes an electric switch in mechanical communication with said diaphragm, said electric switch being actuatable by a displacement of said first fluid within said first sensing bladder side.

17. The tactile sensor of claim 16, wherein said electric switch is an on-off electric switch.

18. The tactile sensor of claim 16, wherein said electric switch is capable of modulating an electric signal, is capable of attenuating an electric signal, or both.

19. The tactile sensor of claim 16, wherein said mechanical connection in contact with said pneumatic diaphragm for detecting movement of said pneumatic diaphragm includes a means of adjusting an amount of actuation of said electric switch in proportion to an amount of said displacement of said first fluid within said first sensing bladder side.

20. A tactile sensor for detecting contact therewith in an ambient environment comprising:
  a plurality of pneumatic diaphragms, at least one of said pneumatic diaphragms having a first diaphragm side and a second diaphragm side, where said second diaphragm side is in pneumatic communication with said ambient environment through a second fluid;
  a plurality of sensing bladders, at least one of said sensing bladders having a first sensing bladder side and a second sensing bladder side, where said second sensing bladder side is in pneumatic communication with said ambient environment;
  a first atrium enclosing a first fluid, said first atrium comprising said first diaphragm side and said first sensing bladder side; and
  a mechanical connection in contact with said at least one pneumatic diaphragm for detecting movement of said at least one pneumatic diaphragm.

21. The tactile sensor of claim 20, wherein:
  each of said plurality of pneumatic diaphragms has a first diaphragm side and a second diaphragm side,
  each of said second diaphragm sides being in pneumatic communication with said ambient environment through said second fluid;
  each of said sensing bladders having a first sensing bladder side and a second sensing bladder side, where said second sensing bladder side is in pneumatic communication with said ambient environment;
  a plurality of first atriums enclosing a first fluid, each of said first atriums comprising one of said first diaphragm sides and one of said first sensing bladder sides; and
  a plurality of mechanical connections each in contact with one of said pneumatic diaphragms for detecting movement of said one pneumatic diaphragm.

22. The tactile sensor of claim 21, wherein said plurality of sensing bladders form an array arranged in a grid along perpendicular axis's.

23. The tactile sensor of claim 21, wherein each of said second diaphragm sides are in fluid communication with a first compensation bladder side of a single compensation bladder, said single compensation bladder having a second compensation bladder side in fluid communication with said ambient environment.

24. The tactile sensor of claim 21, wherein each of said second diaphragm sides are in fluid communication with a first compensation bladder side of one of a plurality of compensation bladders, each of said plurality of compensation bladders having a second compensation bladder side in fluid communication with said ambient environment.

25. A tactile sensor for detecting contact therewith in an ambient environment comprising:
  a pneumatic diaphragm having a first diaphragm side and a second diaphragm side, where said second diaphragm side is in pneumatic communication with said ambient environment;
  said first diaphragm side being biased against said second diaphragm side through said pneumatic diaphragm;
  a sensing bladder having a first sensing bladder side and a second sensing bladder side, where said second sensing bladder side is in pneumatic communication with said ambient environment;
  said first sensing bladder side comprising an inner wall of a vinyl tube sealed on one end, and said second sensing bladder side comprising an outer wall of said vinyl tube separated from said inner wall of said vinyl tube by a tube thickness;
  a compensation bladder having a first compensation bladder side and a second compensation bladder side, where said second compensation bladder side is in pneumatic communication with said ambient environment;
  said first compensation bladder side comprising an inner finger glove wall of a finger glove, where said inner finger glove wall is sealingly attached about an outer circumference of a hollow rigid member, and said second compensation bladder side comprising an outer finger glove wall of said finger glove separated from said inner finger glove wall by a glove thickness;
  a first atrium enclosing a first fluid, said first atrium comprising said first diaphragm side and said first sensing bladder side;
  a second atrium enclosing a second fluid; said second atrium comprising said second diaphragm side and said first compensation bladder side; and
  a mechanical connection in contact with said pneumatic diaphragm for detecting movement of said pneumatic diaphragm.

26. The tactile sensor of claim 25, wherein said electric switch is capable of modulating an electric signal, is capable of attenuating an electric signal, or both.

27. A method to tactilely sense an object comprising the step of:
  contacting an object in an ambient environment with a sensing bladder of a tactile sensor,
  said tactile sensor comprising:
  a pneumatic diaphragm having a first diaphragm side and a second diaphragm side, where said second diaphragm side is in pneumatic communication with said ambient environment through a second fluid;
  a sensing bladder having a first sensing bladder side and a second sensing bladder side, where said second sensing bladder side is in pneumatic communication with said ambient environment;
  a first atrium enclosing a first fluid, said first atrium comprising said first diaphragm side and said first sensing bladder side; and
  a mechanical connection in contact with said pneumatic diaphragm for detecting movement of said pneumatic diaphragm.

28. The method of claim 27, further comprising the step of determining an output value of an electrical switch in mechanical communication with said mechanical connection in contact with said pneumatic diaphragm for detecting movement of said pneumatic diaphragm.

29. The method of claim 27, wherein said second diaphragm side is in fluid isolation from said ambient environment.

30. The method of claim 27, wherein said second diaphragm side is in fluid communication with said ambient environment.

* * * * *